April 23, 1957 — R. G. DAY — 2,790,133
REGULATED POWER SUPPLY
Filed Dec. 14, 1953
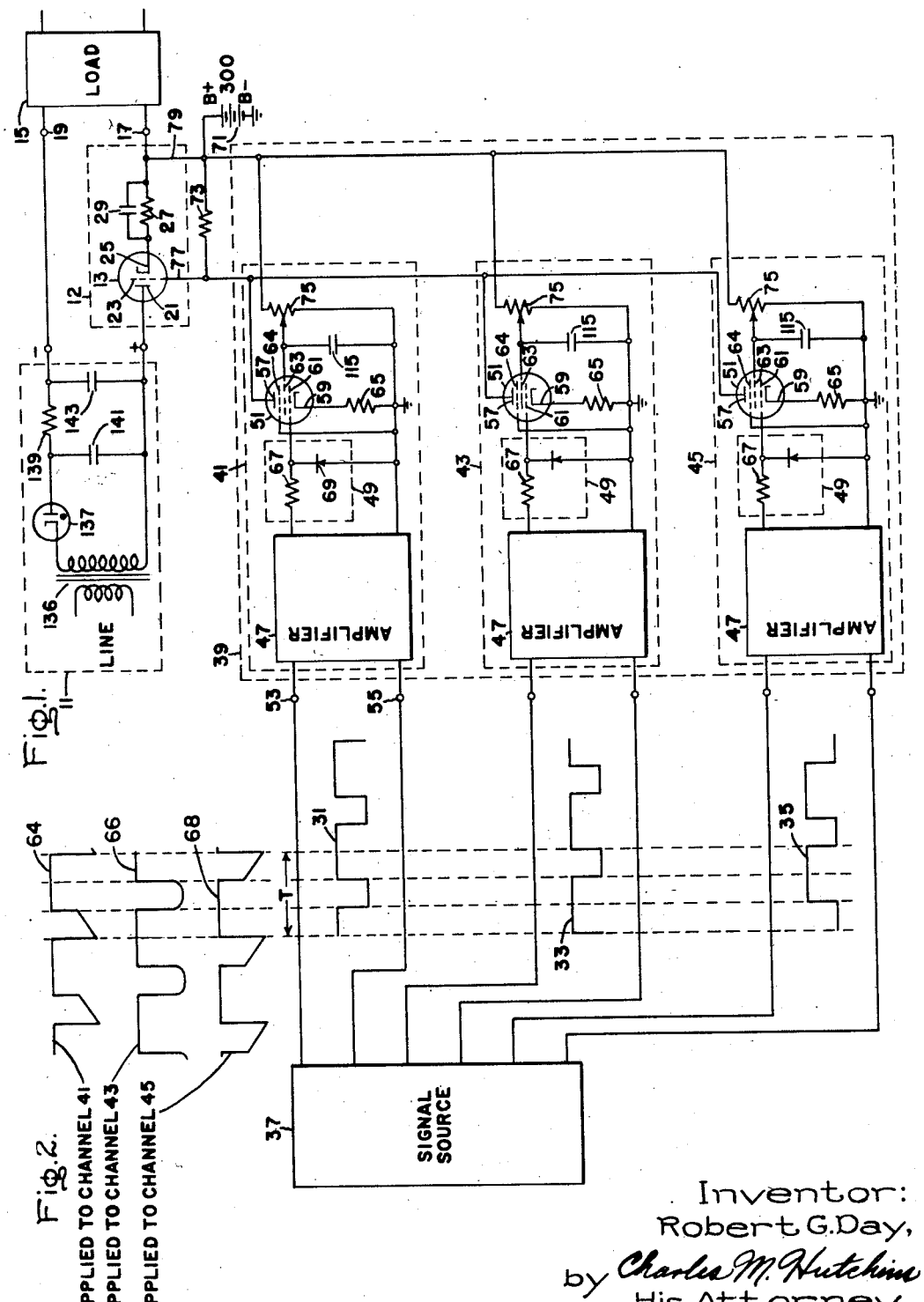
Inventor:
Robert G. Day,
by Charles M. Hutchins
His Attorney.

United States Patent Office
2,790,133
Patented Apr. 23, 1957

2,790,133

REGULATED POWER SUPPLY

Robert G. Day, Constantia, N. Y., assignor to General Electric Company, a corporation of New York Application December 14, 1953, Serial No. 398,057

7 Claims. (Cl. 323—22)

This invention relates to a power supply for electronic apparatus, and more particularly to control circuits for regulating the output voltage of such power supplies.

In some circuit applications, such as color television transmitting systems, it is desirable to control the voltage applied to a load circuit in accordance with the individual amplitudes of a plurality of independent controlling signals so that the voltage applied to the load circuit at any instant is dependent on the amplitudes of the controlling signals. An example of such a load circuit is the voltage divider for the photomultiplier tube utilized in a field-sequential color-television flying-spot scanner. However, the present invention in its broader aspects is not limited to such a system and is applicable to any type of load requiring a power supply that is controlled in accordance with the amplitudes of a plurality of independent signals.

Accordingly, it is the principal object of the present invention to provide a regulated power supply controlled by a plurality of independent controlling signals.

A primary object of this invention may be realized through the provision of a power supply, a regulating device series connected to the power supply and whose resistance is variable according to the control voltage applied thereto, means for applying a plurality of independent control signals to the regulating device to vary the resistance thereof in accordance with the amplitudes of the controlling signals, and means to individually vary the amplitudes of the controlling signals.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing in which:

Fig. 1 represents a schematic circuit diagram of a regulated power supply embodying the present invention, together with certain illustrative input wave forms; and Fig. 2 represents alternative input wave forms for the circuit shown in Fig. 1.

Referring now to the drawing, the present invention generally comprises a power supply 11 which conventionally includes a power transformer 136, a gas rectifier tube 137 and a pi filter including a filter resistor 139 and by-pass capacitors 141 and 143. A series regulator stage 12 is also connected between one terminal of the pi filter and an output terminal 17. Any suitable load 15 is connected between output terminals 19 and 17 which requires a power supply whose voltage is controlled by signals external to the load and power supply itself.

The regulator stage 12 includes a series regulator tube 13 having a plate 21, a grid 23, and a cathode 25. A biasing resistor 27 and a bypass capacitor 29 supply bias for the grid 23. The tube 13 acts as a variable resistance because the voltage drop between the plate 21 and the cathode 25 is dependent on the control signal applied to the grid 23. The voltage applied to the load 15 is equal to the difference between the power supply voltage and the voltage drop across the series regulator stage 12.

Control signals for the grid 23, as indicated at 31, 33 and 35 are generated by any suitable signal source 37 which may, for example, be a color-television synchronizing-pulse generator. Three signal inputs are shown because color-television systems usually employ three colors. However, the invention is neither limited to the field of color television, nor is it limited to the use of three controlling signals, as will hereinafter appear. The wave shape and phase relationship of the signals is as illustrated by the waveforms 31, 33 and 35, drawn to a common horizontal time scale. A more detailed description of the signals 31, 33, and 35 is set forth below.

The signals 31, 33, and 35 are applied to the grid 23 of the series regulator tube 13 through a control circuit 39. The circuit 39 is provided with means to individually amplify the signals 31, 33, and 35 to vary the magnitudes of the amplified signals. Means are also provided to combine the signals and to conductively couple the combined signals to the grid 23.

The control circuit 39 includes a separate cascaded stage for each control signal generated by signal source 37. Since, in the illustrated embodiment, three control signals are utilized, control circuit 39 includes three channels 41, 43, and 45 for signals 31, 33, and 35 respectively. However, the control circuit 39 is not limited to three channels, the number of channels depending on the number of control signals. All of the channels 41, 43, and 45 may be identical, and hence only channel 41 is hereinafter described in detail.

Channel 41 includes a conventional input amplifier 47, a clipping circuit 49, and a pentode control tube 51 having a plate 57, a cathode 59, a control grid 61, a screen grid 63, and a suppressor grid 64.

In the illustrative embodiment of the invention, the signals 31, 33, and 35 generated by signal source 37 are preferably square waves having upper and lower voltage levels. The phase relation and the length of time each wave remains at the upper and lower voltage level are such that only one wave is at the lower voltage level at any one instant. This occurs when all signals have equal time periods T and each is at the lower voltage level for a time of $$\frac{T}{N}$$

and at the upper voltage level for a time of $$\frac{NT-T}{N}$$

where N is the number of signals. In the illustrated embodiment, each wave is at the lower voltage level for a time $$\frac{T}{N}$$

and at the upper level for a time $$\frac{NT-T}{N}$$

Other types of waveforms may be utilized to control the tubes 51, depending on the desired wave to be applied to control grid 23 of tube 13. An example of other types of waveforms that might be utilized are the complementary waveforms indicated at 64, 66, and 68 in Fig. 2. These waveforms when correlated with conduction characteristics of the tubes 51 produce a voltage having a varying magnitude characteristic so that when the output voltage of the power supply is applied to a photomultiplier tube of a flying-spot scanner, a uniformly shaded picture signal results.

The output signal from amplifier 47 is fed to the grid 61 of the tube 51 by the clipping circuit 49 which includes a resistor 67 and a clipping diode 69. The diode 69 conducts when the negative-going swing of the amplified signal reaches a predetermined negative maximum and thus clips the lower voltage level at a predetermined value. In the illustrated embodiment, the amount of amplification derived from amplifier 47 and the properties of the components of the clipping circuit 49 are such that the lower voltage level of signal 31, as amplified and clipped, enables the flow of plate current in tube 51 while the upper voltage level prevents the flow of plate current. Since only one of the signals 31, 33, and 35 is at the lower voltage level at any one instant, only one of the tubes 51 is conductive at any time.

Plate voltage for the tubes 51 is supplied from a source of potential 71 through a common load resistor 73. In the preferred embodiment of the present invention, only one of the tubes 51 is conductive at any instant because of the relationship between control signals 31, 33, and 35. Therefore, the voltage developed across resistor 73 is sequentially determined by the magnitude of the signals 31, 33, and 35, and the voltage waveform across the common load resistor 73 has three levels that are proportional to the levels of signals 31, 33, and 35.

Each of the tubes 51 is provided with means for individually controlling the amplification of that control tube. In the illustrated embodiment, the amplification-controlling means includes a voltage divider 75 connected across the voltage source 71. The voltage divider 75 is connected to the screen grid of the associated control tube 51. The higher the voltage applied to the screen grid 63, the larger the plate current, and hence the higher the voltage developed across the resistor 73 during the conduction period. Thus, the output voltage level of each channel 41, 43, and 45 can be controlled individually without varying the other voltage levels.

The common load resistor 73 is connected between the grid and cathode of series regulator tube 13, as by conductors 77 and 79, and therefore, the voltage developed across the resistor 73 controls the flow of current through the plate-cathode circuit of the series regulator tube 13. Thus, the output load voltage across terminals 19 and 17 is effectively controlled because the voltage applied to the load 15 is dependent on the voltage drop across tube 13, as mentioned above.

The cathode of the series regulator 13 is at A.-C. ground potential. Therefore, its plate potential varies in accordance with the change of the tube impedance. This indicates that the entire power supply is at a voltage different from D.-C. ground potential. Since the entire power supply is off ground, no part of the power supply circuit 11 can be grounded and the capacitance to ground must be minimized to allow plate 21 of tube 13, capacitors 141 and 143, resistor 139, rectifier 137, and the secondary of transformer 136 to change potential at a rate prescribed by the rate of change at signals 31, 33, and 35. All power supply components are mounted off the chassis in such a position to minimize the capacitance to ground. In the power supply circuit, as depicted, any 60-cycle A.-C. voltage capacitively coupled from primary to secondary in power transformer 136 appears across the load and series regulator tube 13. To minimize this effect of 60 cycle A.-C. voltage, a low impedance tube, such as both halves of a type 6AS7 tube may preferably be utilized for the tube 13.

While a specific embodiment has been shown and described, it will of course be understood that various modifications may yet be devised by those skilled in the art which will embody the principles of the invention. The appended claims are therefore intended to cover any such modifications within the true spirit and scope of the invention.

What is claimed is:

1. A control circuit for a power supply comprising means for producing a plurality of square-wave control signals having a period of T, each of said signals being at a first voltage level for a time $$\frac{T}{N}$$

and being at a second voltage level for a time $$\frac{NT-T}{N}$$

where N is the number of control signals, each of said input signals being displaced in phase from each other input signal by a period of $$\frac{T}{N}$$

so that only one signal is at said first voltage level at any one time, a plurality of control devices each having at least a plate, a cathode, a control grid, and a screen grid, means for connecting each control signal to the control grid of a different control device so that each control device is biased above cut-off for a period of $$\frac{T}{N}$$

and below cut-off for a period of $$\frac{NT-T}{N}$$

means connected to each of said control devices to control the magnitude of the current flowing through the plates thereof, a common load resistor having first and second terminals, means connecting the plates of all of said devices to the first terminal of said load resistor, a source of direct voltage, means connecting said source of direct voltage to the second terminal of said load resistor, a series regulator tube having a plate, a grid, and a cathode, means for connecting said common load resistor between said grid and said cathode of said series regulator tube, and means for connecting the plate of said series regulator tube to said power supply.

2. A control circuit for a power supply comprising three input amplifiers; means associated with said amplifiers for producing a square wave input signal to each of said amplifiers, each of said signals having a period of T and being at a first voltage level for time equal to $$\frac{T}{N}$$

and being at a second voltage level for a time equal to $$\frac{NT-T}{N}$$

where N is any number greater than one, the phase of such signals being such that only one signal is at said first voltage level at any one time; three control tubes having at least a plate, a cathode, a control grid, and a screen grid; three coupling circuits, a different coupling circuit being connected to each of said input amplifiers; three clipping circuits, each clipping circuit being connected between a coupling circuit and the control grid of a control tube for clipping the output voltage of said input amplifier at a level so that the associated control tube is cut-off for a period of $$\frac{NT-T}{T}$$

and is conductive for a period of $$\frac{T}{N}$$

means connected to each different screen grid to control the magnitude of the current flowing through each of said plates; a source of direct voltage having positive and negative terminals; a common load resistor having first and second terminals; means connecting all of said plates of said control tubes to the first terminal of said load resistor; the second terminal of said load resistor being connected to said positive terminal of said direct-voltage source, the negative terminal of said direct-voltage source being grounded; a series regulator tube having a plate, a grid, and a cathode; means for connecting the plate of said series regulator tube to said power supply; first and second output terminals; means connecting the positive terminal of said direct-voltage source to said first output terminal; means connecting the cathode of said series regulator tube to said first output terminal; and means for connecting said first terminal of load resistor to the grid of said series regulator tube.

3. A control circuit for varying the voltage applied to an electron discharge device having plate, grid, and cathode electrodes and having its plate connected in a series with a power supply, said control circuit comprising means for receiving N signals, where N is a plural integer, each signal having first and second voltage levels, only one of said signals being at said first level at any one time, N control tubes each having plate, control grid, screen grid, and cathode electrodes, means for applying each of said N signals to the control grid of a different control tube, the grid cut-off voltage of said control tubes being such that said first level enables the flow of current therethrough while said second level prevents the flow of current therethrough, means connected to the screen grid of said control tubes for varying the amount of plate current flowing in said tube, and means for connecting the plates of said control tubes to said grid of said electron discharge device.

4. A control circuit for varying the voltage applied to an electron discharge device having plate, grid, and cathode electrodes and having its plate connected in a series with a power supply, said control circuit comprising means for receiving N signals, where N is a plural integer, N control tubes each having a plate electrode, control electrode, auxiliary control electrode and cathode electrode, means for applying each of said N signals to the control electrode of a different control tube, means including said auxiliary control electrode for independently varying the amount of plate current flowing in each of said tubes, and means for conductively coupling the plates of said control tubes to said grid of said electron discharge device.

5. A control circuit for varying the voltage applied to a series regulator tube having plate, grid, and cathode electrodes and having its plate connected in series with a power supply, said control circuit comprising means for receiving N number of signals, where N is a plural integer, each signal having first and second voltage levels and only one of said signals being at said first voltage level at any one time, N number of control tubes each having at least plate, control grid, and cathode electrodes, means for applying each of said N signals to the control grid of a different control tube, the grid cut-off voltage of said control tubes being such that said first voltage level enables the flow of current therethrough while said second level prevents the flow of current therethrough, and means for connecting the plates of said control tubes to said grid of said series regulator tube.

6. In combination, means for generating N voltage signals each having a period of T, where N is a plural integer, each of said signals having a first and second voltage level, said signals being at said first voltage level for a period of $$\frac{T}{N}$$

and at said second voltage level for a period of $$\frac{NT-T}{N}$$

a power supply, a series regulator tube having plate, grid, and cathode electrodes and connected to said power supply, N control devices each having plate, cathode, screen grid, and control grid electrodes, means for coupling each of said voltage signals to the control grid of a different control device so that said first level of said voltage signals enables the passage of current through said control device and said second level of said voltatge signals prevents the passage of current through said control device, means connected to the screen grid of each different control device for individually regulating the magnitude of current flowing through the plate of each of said control devices, a source of voltage having positive and negative terminals, a common load resistor having one terminal connected to said positive terminal; means for conductively connecting said common load resistor between the control grid and the cathode of said series regulator tube so that the current flowing from said plate to said cathode of said series regulator tube is controlled by the voltage across said common load resistor.

7. A regulated power supply comprising a source of direct voltage having positive and negative terminals, a series regulator tube having a plate, a grid, and a cathode, means connecting said plate to said positive terminal, means for supplying grid bias to said series regulator tube, means for generating three signals, each of said signals having a first and second voltage level and a period of T, said signals being at said first voltage level for a time equal to $$\frac{T}{3}$$

and at said second voltage level for a time equal to $$\frac{2T}{3}$$

three input amplifiers, means for coupling a different one of said signals to each of said input amplifiers, three control tubes each having a plate, a cathode, a screen grid, and a control grid, clipping means coupled between said input amplifiers and said control grid of said control tubes for clipping the output signals of said input amplifiers so that said amplified first voltage level enables the passage of current through said control tubes and the amplified second voltage level prevents the passage of current therethrough, said input signals being displaced in phase by one-third of a period from each other input signal so that only one of said control tubes is conductive at any one time, means connected to said screen grid for regulating the magnitude of current flowing through said plates of said control tubes, a source of potential having the negative terminal thereof grounded, a common load resistor connected between the positive terminal of said source of potential and all of said plates of said control tubes, and means for connecting said common load resistor between said cathode and said grid of said series regulator tube so that the resistance of said series regulator tube is determined by the voltage developed across said common load resistor.

References Cited in the file of this patent

UNITED STATES PATENTS 2,643,359    Shenk et al. _____ June 23, 1953